(12) United States Patent
Nagarajan

(10) Patent No.: US 11,587,102 B2
(45) Date of Patent: Feb. 21, 2023

(54) INSTANT QUALIFICATION CROSS CHANNEL OFFER TARGETING

(71) Applicant: American Express Travel Related Services Company. Inc., New York, NY (US)

(72) Inventor: Venkatesh Nagarajan, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 386 days.

(21) Appl. No.: 15/960,103

(22) Filed: Apr. 23, 2018

(65) Prior Publication Data
US 2019/0325468 A1 Oct. 24, 2019

(51) Int. Cl.
*G06Q 30/02* (2012.01)
*G06Q 30/0207* (2023.01)

(52) U.S. Cl.
CPC .............. *G06Q 30/0207* (2013.01)

(58) Field of Classification Search
CPC ................................................ G06Q 30/0207
See application file for complete search history.

(56) References Cited

U.S. PATENT DOCUMENTS

| | | | | |
|---|---|---|---|---|
| 7,966,255 B2* | 6/2011 | Wong | ........ | G06Q 20/105 705/41 |
| 8,412,593 B1* | 4/2013 | Song | ........ | G06Q 30/00 705/35 |
| 8,903,741 B2* | 12/2014 | Imrey | ........ | G06Q 40/00 705/38 |
| 8,935,797 B1* | 1/2015 | Silver | ........ | G06F 21/6245 726/26 |
| 9,767,488 B1* | 9/2017 | Wang | ........ | G06Q 30/0275 |
| 2002/0026356 A1 | 2/2002 | Bergh et al. | | |
| 2010/0049588 A1* | 2/2010 | Debow | ........ | G06Q 40/02 705/38 |
| 2011/0125565 A1 | 5/2011 | Macilwaine | | |
| 2011/0264490 A1 | 10/2011 | Durvasula et al. | | |

(Continued)

OTHER PUBLICATIONS

Wiley Encyclopedia of Computer Science and Engineering (Year: 2009).*

(Continued)

*Primary Examiner* — Breffni Baggot
(74) *Attorney, Agent, or Firm* — Thomas | Horstemeyer, LLP

(57) ABSTRACT

A system for instant qualification cross channel offer targeting is disclosed. The system may receive a plurality of personally identifiable information (PII) elements from at least one of a customer device or an affiliate system. The system may determine a credit authorization state in response to the PII element. The system may receive a first request to generate an offer from at least one of the customer device or the affiliate system. The system may generate the offer in response to an offer optimization model, the credit authorization state, and the first request to generate an offer. The system may hash the plurality of PII elements and determine a unique hash based on the plurality of PII elements. The system may associate the unique hash to the offer and store the offer as offer data.

20 Claims, 3 Drawing Sheets

(56) References Cited

U.S. PATENT DOCUMENTS

| | | | |
|---|---|---|---|
| 2012/0022944 A1* | 1/2012 | Volpi | G06Q 30/0207 |
| | | | 705/14.1 |
| 2012/0101892 A1 | 4/2012 | Lefebvre | |
| 2012/0166272 A1* | 6/2012 | Wiley | G06Q 30/0246 |
| | | | 705/14.45 |
| 2012/0210134 A1* | 8/2012 | Mitter | H04L 9/3242 |
| | | | 713/171 |
| 2015/0262246 A1 | 9/2015 | Stack et al. | |
| 2017/0053281 A1* | 2/2017 | Howe | G06Q 20/382 |
| 2018/0075527 A1* | 3/2018 | Nagla | G06F 21/6218 |

OTHER PUBLICATIONS

Staten et al. "The impact of opt-in privacy rules on retail credit markets: A case study of MBNA." In: Duke Law Journal. Feb. 2003 Retrieved on Jun. 14, 2019.
International Search Report and Written Opinion dated Oct. 3, 2019 in PCT Application No. PCT/US2019/026823.

\* cited by examiner

INSTANT QUALIFICATION CROSS CHANNEL OFFER TARGETING

FIELD

The present disclosure generally relates to providing prospect identification and offer targeting for returning prospects.

BACKGROUND

Prospective customers may request that an issuer provide credit services offerings. The prospective customers may also provide customer information in response to an offer request. An issuer may provide one or more offers which the customer may accept, reject, or ignore. Offer requests may be generated by direct customers or by affiliate channels. The offer may vary in response to the customer information or the offer channel. Traditionally, an offer may expire upon the termination of the customer interaction. In this regard, a customer may tend to re-input information for each channel such that offers may tend to be asynchronous across channels. In this regard, a customer may tend to receive conflicting, unappealing, or otherwise off target offers.

SUMMARY

In various embodiments, systems, methods, and articles of manufacture (collectively, the "system") for instant qualification cross channel offer targeting are disclosed. The system may receive a plurality of personally identifiable information (PII) elements from at least one of a customer device or an affiliate system. The PII may be received by a computer based system in communication with a database. The system may determine a credit authorization state in response to the PII element. The system may receive a first request to generate an offer from at least one of the customer device or the affiliate system. The system may generate the offer in response to an offer optimization model, the credit authorization state, and the first request to generate an offer. The system may hash the plurality of PII elements and determine a unique hash based on the plurality of PII elements. The system may associate the unique hash to the offer and store the offer as offer data.

In various embodiments, the plurality of PII elements comprises at least one of a first name, a surname, a middle name, a middle initial, a primary address, or a portion of a social security number. In various embodiments, the offer comprises at least one of an offer threshold or an offer category. In various embodiments, the system may store an offer code defining the generated offer and a source code as offer data and associate the offer data to the unique hash. The system may transmit the plurality of PII elements to a credit data system, receive raw credit data from the credit data system, and determine the credit authorization state as a function of the raw credit data. The system may transmit the offer to at least one of the customer device or the affiliate system, generate customer interaction data based on the offer, and associate the unique has to the customer interaction data and store the customer interaction data as customer data.

In various embodiments, the system may also receive a second request to generate an offer from at least one of the customer device or the affiliate system, wherein the second request to generate an offer comprises the plurality of PII. The system may hash the plurality of PII elements in response to the second request to generate an offer and determine the unique hash based on the plurality of PII elements. The system may fetch the offer associated with the unique hash and transmit the offer to at least one of the customer device or the affiliate system. In various embodiments, the system may alter the offer in response to the second request to generate an offer and an offer targeting rule.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
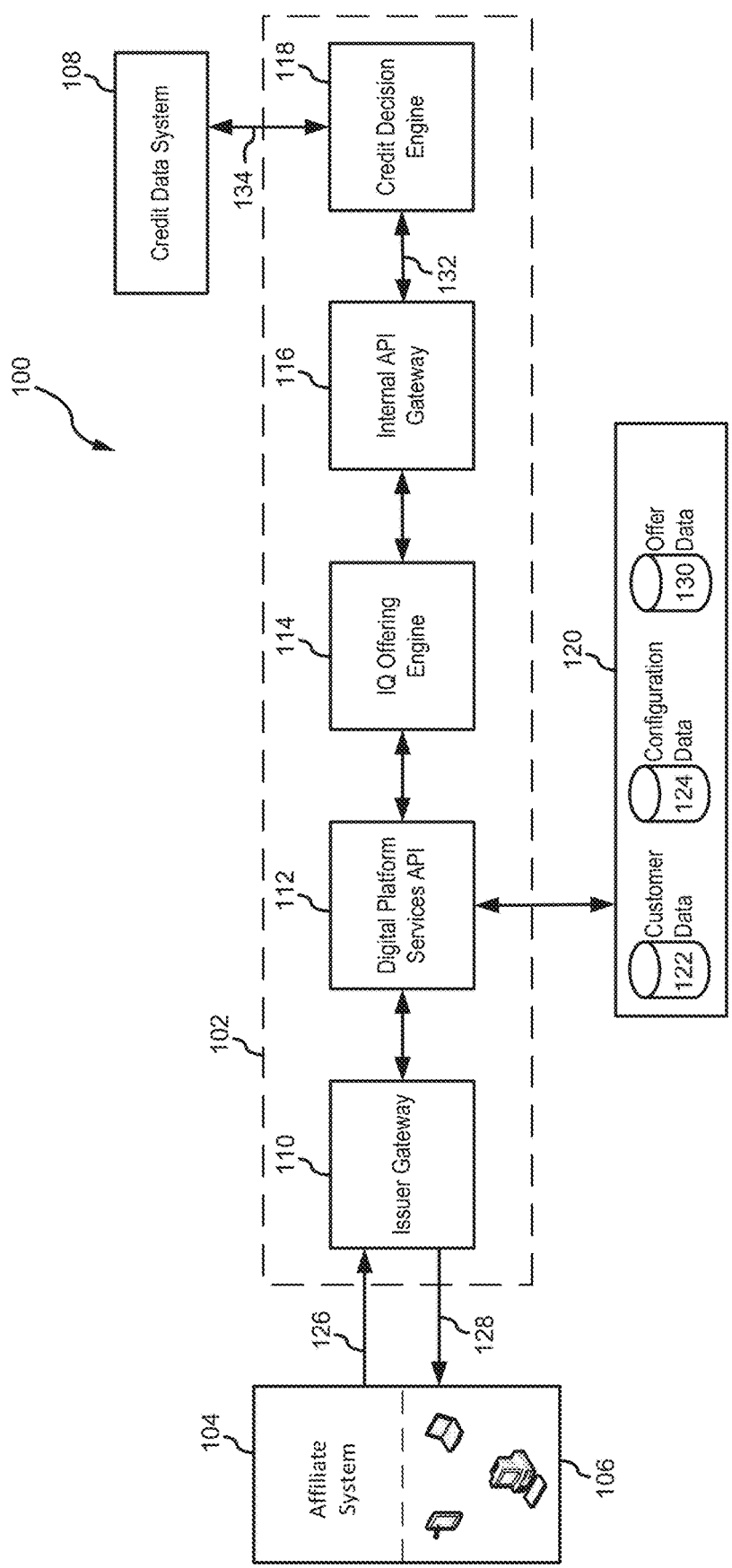
FIG. 1 is a block diagram illustrating various system components of a system for instant qualification cross channel offer targeting, in accordance with various embodiments.

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may provide a greater level of sophistication and control for issuer offerings across channels. While prior art systems typically generate only one offer per customer request (i.e. per information input set), the current system may generate multiple offers per request. The system may allow for the generation of more offers (e.g., 100 times more) per an initial Instant Qualification (IQ) information input. In this regard, the system may also reduce the cost of development or system processing time for the larger number of available offers by not requiring additional hardware development or reprocessing of prior IQ information. The system may reduce the risk of fraud associated with IQ requests (e.g., offer shopping) by generating a master offer or offer set as a function of the IQ information and an offer optimization algorithm. The system may also reduce the risk of fraud associated offers by synchronizing offers across offer channels. The system may simplify reconciliation offers and enhance targeting of relevant offers by providing a central linkage between IQ information and customer requests for offers through a one way hashing algorithm. Benefits of the present disclosure may apply to any suitable use of all types of offers (electronic or otherwise). For example, the present disclosure may apply in corporate contexts, as well as in consumer use of all types of offers.

This process improves the functioning of the computer. For example, by decreasing requests for external data stores or third party processing, offer generation may be expedited. Similarly, the process increases the reliability and speed of offer presentation by enabling customer identity credentials for offer generation and by decreasing credit validation interfaces with third party networks. In various embodiments, a one-to-one tie is enabled between the customer and the offer generated by the issuer which increases the reliability and speed of offer presentation and offer routing. In this regard, by transmitting, storing, and accessing data using the processes described herein, the security of the data is improved and fraud is reduced, which decreases the risk of the computer or network from being compromised. Such improvements also increase the efficiency of the network by reducing the portion of transaction volume comprising fraudulent transactions. In various embodiments, hashing and storing using the processes described herein tends to significantly reduce back end processing and tends to reduce processing time required to determine a credit authorization state. Credit authorization engine algorithms and decision engines tend to be computationally resource intensive. In this regard, the processes described herein may tend to decrease processing overhead of computing systems comprising credit decision engines and/or credit authorization models. In various embodiments, the processes described herein may tend to increase network availability by tending to reduce front end and back end process calls. In this regard, the processes described herein may tend to save processing resources including CPU time, memory resources, and network resources.

In various embodiments, and with reference to FIG. 1, a system 100 may comprise an issuer system 102, an affiliate system 104, a customer device 106, and a credit data system 108. In various embodiments, issuer system 102 may further comprise an issuer gateway 110, a platform services Application Programming Interface (API), an Intelligent Quotation (IQ) offering engine 114, an internal API gateway 116, a credit decision engine 118, a database 120. Any of these components may be outsourced and/or be in communication with issuer system 102. In various embodiments, database 120 may comprise any number of data elements or data structures such as customer data 122 and configuration data 1124. Affiliate system 104 may comprise software and/or hardware in communication with issuer system 102 and customer device 106. System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, customer device 106 may comprise hardware and/or software configured to allow a customer, prospective customer, transaction account owner, and/or the like, access to system 100. For example, customer device 106 may comprise any suitable device that is configured to allow a user to communicate with a network and issuer system 102 via affiliate system 104 or issuer gateway 110. Customer device 106 may include, for example, a personal computer, personal digital assistant, cellular phone, kiosk, and/or the like. Customer device 106 may allow a user to communicate with issuer system 102 to input elements of customer data 122 and transmit a request 126 for and to receive an offer 128, and/or any other suitable task. Customer device 106 may be in electronic and/or operative communication with issuer system 102 and/or affiliate system 104. In this regard, customer device 106 may comprise any suitable hardware and/or software components capable of sending and receiving data, for example, a personal computer, personal digital assistant, cellular phone, kiosk, and/or the like. In various embodiments, customer device 106 may transmit a request 126 comprising Personally Identifiable Information (PII) to issuer system 102 via issuer gateway 110. In various embodiments, request 126 may be generated by multiple devices and multiple channels such as, for example, one or more affiliate systems 104.

In various embodiments, issuer system 102 may be configured as a central network element or hub to access various systems, engines, and components of system 100. Issuer system 102 may comprise a network, computer-based system, and/or software components configured to provide an access point to various systems, engines, and components. Issuer system 102 may be in operative and/or electronic communication with customer device 106, affiliate system 104, credit data system 108, issuer gateway 110, platform services API 112, IQ offering engine 114, internal API gateway 116, credit decision engine 118, and/or database 120. In this regard, issuer system 102 may allow communication from customer device 106 to systems, engines, and components of system 100. Issuer system 102 may also allow communication from affiliate system 104 to systems, engines, and components of system 100. In various embodiments, issuer system 102 may receive device identity (e.g. fingerprinting) data from customer device 106. In various embodiments, device fingerprinting data may be stored as customer data 122.

In various embodiments, IQ offering engine 114 may be configured to generate offer 128. IQ offering engine 114 may generate offer 128 in response to customer request 126. In various embodiments, a customer may initiate an offer request process from customer device 106 through the issuer gateway 110. In various embodiments, a customer may communicate with affiliate system 104 from customer device 106 and affiliate system 104 may initiate an offer request process on behalf of the customer via issuer gateway 110. Issuer gateway 110 may receive the request 126 to generate an offer customer device 106 or from affiliate system 104 and may call platform services API 112 to pass request 126 to IQ offering engine 114 which may be configured to receive request 126. IQ offering engine 114 may also be configured to transmit offer 128 in response to request 126. For example, IQ offering engine 114 may transmit the generated offer 128 to customer device 106 or affiliate system 104 via platform services API 112 and issuer gateway 110. Issuer gateway 110 and platform services API 112 may comprise and incorporate hardware and/or software components configured to transmit the request 126 and offer 128. IQ offering engine 114 may comprise and incorporate hardware and/or software components configured to generate and transmit offer 128. IQ offering engine engine 114 may be in operative and/or electronic communication with issuer system 102, issuer gateway 110, platform services API 112, database 120, internal API gateway 116, credit decision engine 118, affiliate system 104, and/or customer device 106. IQ offering engine 114 may communicate with database 106 to store and maintain data on generated offers as offer data 130. In various embodiments, IQ offering engine 114 may communicate with database 106 via platform services API 112. In various embodiments, IQ offering engine 114 may, in response to receiving a request 126 comprising PII, generate a one way hash of the PII which may be stored as customer data 122.

In various embodiments, platform services API 112 may incorporate various hardware and/or software components. Platform services API 112 may be in operative and/or electronic communication with issuer system 102, issuer gateway 110, IQ offering engine 114, database 120, affiliate system 104, and/or customer device 106. Platform services API 112 may be configured to transmit request 126, offer 128, and/or other calls between issuer system 102 elements in response to receiving a call.

In various embodiments, internal API gateway 116 may incorporate various hardware and/or software components. Internal API gateway 116 may be in operative and/or electronic communication with issuer system 102, IQ offering engine 114, database 120, and/or credit decision engine 118. Internal API gateway 116 may be configured to transmit credit information, customer data, a request for credit decision, and/or other calls between issuer system 102 elements in response to receiving a call.

In various embodiments, credit decision engine 118 may be configured to process credit information. Credit decision engine 118 may process credit information by communicating with credit data system 108 to recall data on a prospective customer credit score. Credit decision engine 118 may, in response to a credit authorization request 132 from IQ offering engine 114, send a credit check request 134 to credit data system 108, via issuer system 102, comprising PII contained within request 126. Credit data system 108 may receive credit check request 134 and return raw credit data to credit decision engine 118. In various embodiments, credit decision engine 118 may run eligibility and/or optimization models in response to the raw credit data and generate a credit rating. Credit decision engine 118 may be in operative and/or electronic communication with issuer system 102, database 120, IQ offering engine 114, internal API gateway 116, and/or platform services API 112.

In various embodiments, database 120 may be configured to store and maintain data relating to requests 126 as customer data 122. For example, customer data 122 may comprise unique hash values generated as a function of PII and a one way hashing function, customer device information, customer interaction data and/or clickstream data, offer impression threshold, and/or the like. Database 106 may store the customer data 122 using any suitable technique described herein or known in the art. Customer data 122 may be in operative and/or electronic communication with IQ offering engine 114, platform services API 112, internal API gateway 116, and/or credit decision engine 118.

In various embodiments, database 120 may be configured to store and maintain offer data 130 relating to offers generated by IQ offering engine 114. Offer data 130 may comprise data such as offer details, offer code, source code and/or channel information, offer date, offer count, and other data. Database 106 may store the offer data 130 using any suitable technique described herein or known in the art. In various embodiments, offer data 130 may be written to database 120 in response to at least one of an offer request process, an IQ offer generation process, or an offer targeting process. Offer data 130 may be in operative and/or electronic communication with IQ offering engine 114, platform services API 112, internal API gateway 116, and/or credit decision engine 118. In various embodiments, offer data 130 may be associated with customer data 122.

In various embodiments, database 120 may be configured to store and maintain configuration data 124. For example, a template of PII for hashing, an offer expiration threshold, an offer template, a customer data longevity parameter, and/or other such similar data. Configuration data 124 may be stored in database 120 using any suitable technique described herein or known in the art. Configuration data 124 may be in operative and/or electronic communication with IQ offering engine 114, platform services API 112, internal API gateway 116, and/or credit decision engine 118.

Figure 2:
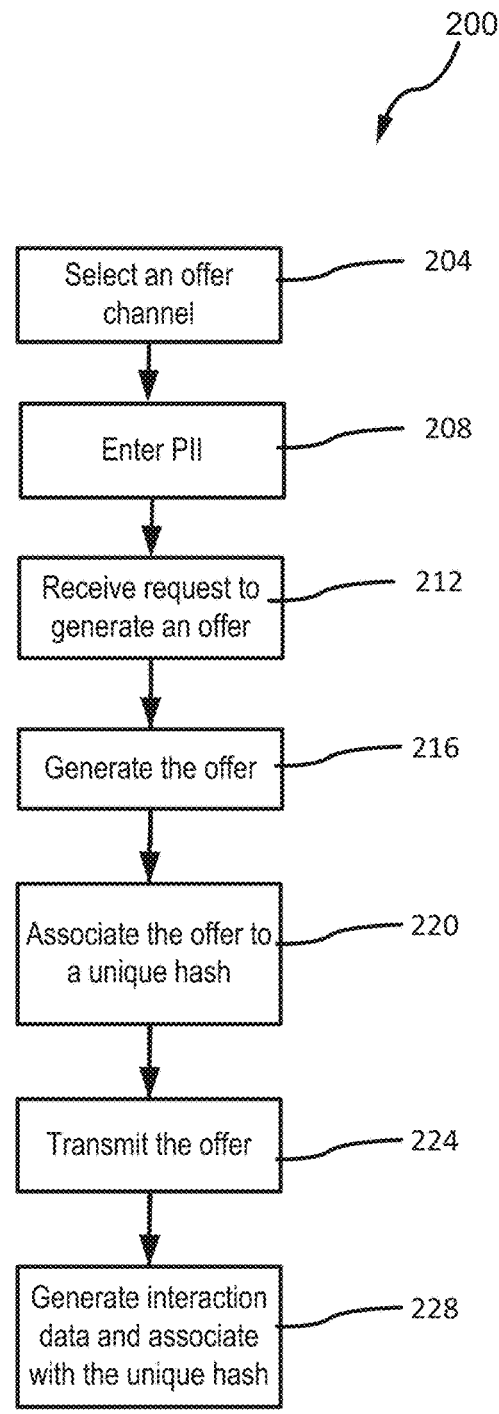
FIG. 2 illustrates a process flow for instant qualification cross channel offer targeting, in accordance with various embodiments.

In various embodiments, and with reference to FIG. 2, a method 200 for generating an offer is disclosed. Method 200 may allow a customer to request an offer from an issuer. In various embodiments, the request may be implemented via an API and/or through any other suitable method. Method 200 may also allow issuer to associate the offer with the customer and with the request channel. In this regard, method 200 may enable a greater level of sophistication and control of offers, and the generation of uniform offers across channels to decrease offer confusion and enable offer targeting.

In various embodiments, method 200 may comprise issuer system 102 receiving the request 126 to generate the offer from at least one of the customer device 106 or affiliate system 104 (step 212). In this regard, a customer may input the request to generate the offer into customer device 106 via one or more channels. A channel related to a desired offer may be selected by the customer or customer device 106 (step 204). For example, a customer may select a channel associated with offering categories such as, for example rewards offers, travel offers, or cash-back offers and the like. In various embodiments, customer device 106 may be configured for input of the request to generate an offer by installing an application such as, for example, a web browser. The user may input the request into customer device 106 via a web page, batch file, web service, API, and/or through any other suitable method. In various embodiments, the request 126 may be received by the issuer gateway 110.

The request 126 may comprise an offer solicitation message and customer PII (e.g., a first request to generate an offer). For example, the PII may comprise one or more PII elements such as at least one of a first name, a surname, a middle name, a middle initial, a primary address, and/or a portion of a social security number. In various embodiments, a primary address may comprise a street address, a city, a state, and a zip code. In various embodiments, system 102 may prompt the customer to input one or more of the PII elements. For example, issuer system 102 may prompt the customer to enter a plurality of PII elements (such as a full name, primary address, last four digits of a social security number and/or the like) prior to requesting generation of the offer (Step 208).

In various embodiments, method 200 may comprise issuer system 102 generating an offer 128 (step 216) in response to the request for an offer. For example, IQ offering engine 114 may generate an array or set of offers 128 in response to request 126. In various embodiments, an offer set may be generated by an offer optimization model which may be a function of the PII, a credit authorization state, a channel (i.e., the channel from which request 126 originated such as, for example, a first affiliate system, or a second affiliate system), a customer interaction data and/or clickstream data, an offer impression threshold, a configuration data, and/or any other suitable optimization input. In various embodiments, the optimization model may be developed by a machine learning technique such as, for example, one of a supervised deep learning technique or an unsupervised deep learning technique applied to the customer data 122 and the offer data 130. In various embodiments, offers 128 generated by IQ offering engine 114 may comprise an offer threshold such as, for example, at least one of a rich offer, a median offer, or a poor offer. In various embodiments, an offer threshold may be a function of the credit authorization state and may determine an interest rate, a credit limit, a contract term, a payment term, and/or the like. In various embodiments, an offer set may be generated comprising offers across offer categories such as, for example, a first category, a second category, a third category, etc. In various embodiments, a category may be one of a rewards offers, travel offers, or cash-back offers and the like. In various embodiments, an offer set may comprise a combination of offer thresholds and offer categories, for example, a rich offer of a first category, a median offer of the first category, a rich offer of a second category, a median offer of a third category, and a poor offer of a fourth category. IQ offering engine 114 may also generate the offer to have any other suitable types of data, parameters, limitations, and/or the like.

In various embodiments, IQ offering engine 114 may communicate with database 120 to store the offer set as offer data 130 and may include an associated offer code (e.g., a code defining the generated offer or offer set) or a source code (e.g., a code related to a channel originating request 126 such as a first code related to a first affiliate system and a second code related to a second affiliate system). In various embodiments, database 120 may store data, such as offer data 130, in an unstructured retrievable format such as, for example, a 'big data' table. IQ offering engine 114 may communicate with database 120 via a web page, batch file, web service, API, and/or through any other suitable method. In various embodiments, issuer system 102 may generate a source code or customer interaction data, in response to the request 126, and the offer optimization model may be a function of the source code and/or the customer interaction data.

In various embodiments, the generation of step 216 may comprise determining an offer availability based on the configuration data 124. In this regard, configuration data 124 may comprise limitations of the offer set generated by IQ offering engine 114. For example, a category may be limited in response to a date/time window or date/time range, limiting the dates and/or times that the offer comprising the category may be generated (e.g., the date range of Jan. 5, 2018 to Jan. 12, 2018, a specific date of Jan. 13, 2018, and/or any other suitable time period), or a geographical area (e.g., a zip code, a city, county, state, country, and/or other suitable geographic and/or political subdivision). In other words, a rich offer of a fifth category may only be generated during the date window and/or for requests from a particular zip code. In various embodiments, an offer set may be limited with regard to an offer channel or a promotional campaign such as, for example, offers of the fifth category may be restricted to a particular channel such as, for example, a particular affiliate system. In various embodiments, offers may be restricted in response to the source code (describing the channel) and/or the customer interaction data based on the configuration data 124.

In various embodiments, the generation of step 216 may further comprise determining by issuer system 102 a credit authorization state. For example, credit decision engine 118 may receive a credit authorization request 132 comprising the PII from IQ offering engine 114. IQ offering engine may generate the credit authorization request 132 in response to receiving the PII. Credit decision engine 118 may call credit data system 108 and receive, in response to the PII, raw credit data from credit data system 108. In response to the PII and the raw credit data, credit decision engine may determine a credit authorization state. In various embodiments, the credit authorization state may be determined on the basis of a credit eligibility model. In various embodiments, the credit authorization state is a non-binary state.

In various embodiments, the generation of step 216 may further comprise issuer system 102 hashing the PII, in response to receiving the PII. In various embodiments, IQ offering engine 114 may hash the PII via a one way hashing algorithm and determine a unique hash based on the PII. Upon determining a unique hash, issuer system 102 communicate with database 120 and may store the unique hash as customer data 122 and associate the customer data 122 with the offer data 130 (step 220). Issuer system 102 may communicate with database 120 via a web page, batch file, web service, API, and/or through any other suitable method. In this regard, a customer identity may be associated with the unique hash and the unique hash may be associated with an offer 126 without storing PII in database 120. Such a process improves the storage capacity of database 120 and inhibits recovery of the PII from the unique hash as the unique hash may only be generated in response to a particular PII input and the system need not store raw PII. In various embodiments, the unique hash may be associated with the offer code, an offer generation date, a source code, and/or any other offer data 130. In various embodiments, issuer system 102 may discard the unique hash and the offer data in response to a time threshold. For example, IQ offering engine 114 may discard the unique hash from customer data 122 and discard the associated offer data 130 after a fixed period of time from the offer generation date. In various embodiments, the time period may be configured based on configuration data 124 and may be a function of the channel, for example, a first period for a first channel or a second period for a second channel.

In various embodiments, method 200 may comprise issuer system 102 transmitting the offer 128 to customer device 106 (step 224). In various embodiments, issuer system 102 may transmit offer 128 via the channel associated with the request 126. For example, IQ offering engine 114 may transmit the offer 128 via issuer gateway 110 to affiliate system 104 and transmission may be via an API and/or through any other suitable method. In various embodiments, issuer system 102 may associate the offer transmission with the unique hash as an offer impression (e.g., metadata about the offer, such as a count of offers presented to a customer in response to a request for an offer) and store the association as customer data 122.

In various embodiments, and in response to the offer 128 transmission, a customer may interact with the offer and issuer system 102 may generate customer interaction data and/or clickstream data. In various embodiments, affiliate system 104 may transmit customer interaction data and/or clickstream data which may be received by issuer system 102. In various embodiments, the data generation and transmission may be via an API and/or through any other suitable method. In various embodiments, the customer interaction data may comprise customer interactions such as, for example, whether an offer is selected from the set, whether an offer is rejected, whether a channel is closed (e.g., closing a web page or frame displaying the offer), and/or the like.

Issuer system 102 may associate the clickstream data with the unique hash for storage as customer data 122 (step 228).

Figure 3:
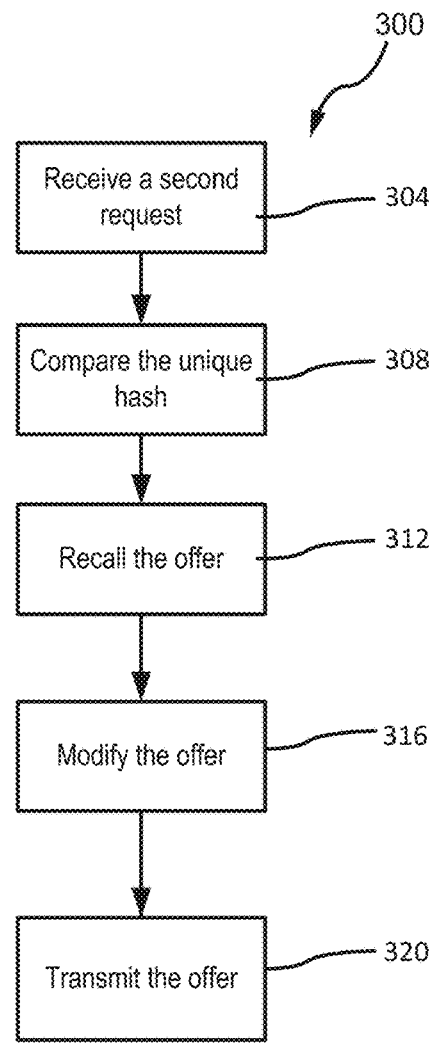
FIG. 3 illustrates a process flow for instant qualification cross channel offer targeting, in accordance with various embodiments.

In various embodiments, and with reference to FIG. 3, a method 300 for cross channel targeting of an offer is disclosed. In various embodiments, method 300 may comprise receiving by issuer system 102 a second request to generate an offer (step 304). Issuer system 102 may receive the second request to generate an offer from the customer device 106 or the affiliate system 104. In various embodiments, the second request may comprise PII elements and issuer system 102 may hash the PII via the one way hashing algorithm. In various embodiments, the second request may comprise the plurality of PII and IQ offering engine 114 may hash the plurality of PII via the one way hashing algorithm and, in response, determine the unique hash (step 308). Stated another way, only the plurality of PII of the first request will output the unique hash when hashed via the one way hashing algorithm. Any variance in PII elements will tend to output a variant hash and, in that regard, the hashing process of the plurality of PII to a unique hash value tends to completely anonymize the plurality of the PII. In this regard, IQ offering engine 114 may compare the hashed output of the plurality of PII of first request to generate an offer (i.e., the unique hash) with the hashed output of the PII of the second request to generate an offer and thereby determine whether the PII of the second request matches the plurality of PII of the first request based on whether the one way hashing algorithm returns the unique hash or a variant hash. Stated another way, the system may identify a returning prospect by comparison between stored unique hash values generated in response to the plurality of PII without storing or comparing raw PII.

In various embodiments, and in response to the unique hash being determined, method 300 may comprise issuer system 102 fetching the offer 128 associated with the unique hash (step 312) and transmitting the offer 128 to the customer device 106 and via the channel associated with the second request for an offer (step 320). In this regard, the offer 128 tends to remain consistent across channels (e.g., across a plurality of affiliate systems) to reduce fraud and offer shopping. In various embodiments, IQ offering engine 114 may communicate with database 120 in response to the second request and recall offer data 130 associated with the unique hash to generate offer 128 and transmit offer 128 to the customer device 106. In various embodiments, IQ offering engine 114 may modify offer 128 in response to the second request for an offer and an offer targeting rule based on the customer data 122 (step 316).

For example, IQ offering engine 114 may alter an offer threshold or an offer category of the offer set of offer 128 such as, for example, altering a rich offer of a first category to a rich offer of a second category or altering a poor offer of a fourth category to a median offer of a fourth category in response to the offer targeting rule. In various embodiments, IQ offering engine 114 may modify an offer by pruning all or part of the offer set, for example where the offer set comprises a first category, a second category, and a third category the IQ offering engine 114 may eliminate the first category and the third category in response to the offer targeting rule. In various embodiments, an offer targeting rule may be based on customer data 122 associated with the unique hash, such as the customer interaction data or the offer impression. For example, customer data 122 may tend to enable an impression threshold rule, whereby an offer exceeding an impression threshold is pruned or altered. In another example, customer data 122 may enable a rule whereby IQ offering engine 114 prunes offer of a first category in response customer data tending to evidence a customer who discards offers of a first category after a first impression of the offer set but not offers of a second category of the offer set after the first impression. In this regard, in response to the second request for an offer, IQ offering engine 114 may deliver more desirable offers by pruning undesirable offers or may alter undesirable offers to be more desirable.

In various embodiments, the offer targeting rule may be based on the configuration data 124 and/or the offer data 130. For example, configuration data 124 and offer data 130 may enable a minimum time between an offer rule or a time limited offer rule by defining to a date/time window or date/time range. In this regard, where a time between the first request for an offer and the second request for an offer falls in relation to the relevant window may gate whether IQ offering engine 114 prunes all or part of the previously generated offer. For example, if an offer comprises a first category associated with a first time window and a second category associated with a second time window where a portion of the first time window and the second time window overlap the IQ offering engine 114 may return the offer comprising the first category and the second category for the overlapping portion of the time window and return either the first category (during the first time window), the second category (during the second time window), or neither the first category nor the second category outside the first time window and the second time window. In various embodiments and in another example, configuration data 124 and/or offer data 130 may tend to enable an offer targeting rule may be based on an impression threshold n (where n is a number which may vary from 2 to 100) such that, where an offer is delivered to the customer a number of times not more than n, IQ offering engine 114 may deliver an offer comprising a first category and, where an offer has been delivered to the customer the number of times greater than n, IQ offering engine 114 may deliver an offer comprising a second category. In yet another example, an offer targeting rule may hold an offer threshold constant across channels and/or may hold an offer category constant across channels. In various embodiments, an offer targeting rule may be based on a machine learning technique such as, for example, one of a supervised deep learning technique or an unsupervised deep learning technique applied to the customer data 122 and the offer data 130.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, who buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user," "consumer," "customer," "cardmember," "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 2-3 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-3, but also to the various system components as described above with reference to FIG. 1.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account," "account number," "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

Phrases similar to "vendor software" or "vendor" may include software, hardware and/or a solution provided from an external vendor (e.g., not part of the merchant) to provide value in the payment process (e.g., risk assessment).

What is claimed is:

1. A method, comprising:

providing a web-based interface to a customer device of a customer;

receiving, by a gateway device for a computer based system from the web-based interface of the customer device, a plurality of personally identifiable information (PII) elements of the customer, wherein the plurality of PII elements of the customer comprise at least first and second PII elements;

receiving, by the gateway device for the computer based system from the web-based interface of the customer device of the customer, a first request to generate an offer via a first channel;

initiating, by the gateway device, an offer request process, wherein the first request is passed to an offering engine for the computer based system via an application programming interface;

generating, by a computer data model of the offering engine for the computer based system, the offer in response to receiving the first request to generate the offer via the first channel, wherein the offer is developed using a machine learning process of the offering engine;

generating, by the offering engine for the computer based system, a first hash, via a one way hashing function, that represents the plurality of PII elements of the customer, wherein at least the first and second PII elements of the plurality of PII elements of the customer are applied as inputs to the one way hashing function;

associating, by the offering engine for the computer based system, the first hash with the offer;

storing, by the offering engine for the computer based system, the offer and the first hash within a database without storing of the plurality of PII elements in the database;

transmitting, by the gateway device for the computer based system, the offer to the customer device of the customer;

receiving, by the gateway device of the computer based system from the customer device of the customer or affiliate system, a second request to generate the offer via a second channel, the second request comprising the plurality of PII elements of the customer;

generating, by the offering engine for the computer based system, a second hash, via the one way hashing function, that represents the plurality of PII elements of the customer, wherein at least the first and second PII elements of the plurality of PII elements of the customer are applied as inputs to the one way hashing function without storing of the plurality of PII elements;

determining, by the offering engine for the computer based system, that the first hash matches the second hash;

retrieving, by the offering engine for the computer based system, the offer associated with the first hash from the database; and transmitting, by the gateway device for the computer based system, the offer to the customer device of the customer or affiliate system in response to determining that the first hash matches the second hash.

2. The method of claim 1, wherein the plurality of PII elements comprise at least one of a first name, a surname, a middle name, a middle initial, a primary address, or a portion of a social security number.

3. The method of claim 1, wherein the offer comprises at least one of an offer threshold or an offer category.

4. The method of claim 1, wherein the generating the offer further comprises:

storing, by the computer based system, an offer code defining the offer and a source code as offer data; and associating, by the computer based system, the offer data to the first hash.

5. The method of claim 1, further comprising:

transmitting, by the computer based system, the plurality of PII elements of the customer to a credit data system;

receiving, by the computer based system, credit data from the credit data system; and determining, by the computer based system, a credit authorization state as a function of the credit data.

6. The method of claim 1, further comprising:

generating, by the computer based system, a customer interaction data based on the offer, wherein the customer interaction data includes clickstream data of the customer that is acquired during browsing of the offer on the customer device;

associating, by the computer based system, the first hash to the customer interaction data; and storing, by the computer based system, the customer interaction data as customer data in the database.

7. A system comprising:

a computing device comprising a processor and a memory; and machine-readable instructions stored in the memory that, when executed by the processor, cause the computing device to at least:

provide a web-based interface to a customer device of a customer;

receive a plurality of personally identifiable information (PII) elements from the web-based interface of the customer device, wherein the plurality of PII elements of the customer comprise at least first and second PII elements;

receive, from the customer device of the customer, a first request to generate an offer via a first channel;

initiate an offer request process, wherein the first request is passed to an offering engine for the computing device via an application programming interface;

generate, by a computer data model of the offering engine, the offer in response to receipt of the first request to generate the offer via the first channel, wherein the offer is developed using a machine learning process of the offering engine;

generate, by the offering engine, a first hash, via a one way hashing function, that represents the plurality of PII elements of the customer, wherein at least the first and second PII elements of the plurality of PII elements of the customer are applied as inputs to the one way hashing function;

associate, by the offering engine, the first hash with the offer;

store, by the offering engine, the offer and the first hash within a database without storing of the plurality of PII elements in the database;

transmit the offer to the customer device of the customer;

receive, from the customer device or affiliate system, a second request to generate the offer via a second channel, the second request comprising the plurality of PII elements of the customer;

generate, by the offering engine, a second hash, via the one way hashing function, that represents the plurality of PII elements of the customer, wherein at least the first and second PII elements of the plurality of PII elements of the customer are applied as inputs to the one way hashing function without storing of the plurality of PII elements;

determine, by the offering engine, that the first hash matches the second hash;

retrieve, by the offering engine, the offer associated with the first hash from the database; and transmit the offer to the customer device of the customer or affiliate system in response to a determination that the first hash matches the second hash.

8. The system of claim 7, wherein the plurality of PII elements of the customer comprise at least one of a first name, a surname, a middle name, a middle initial, a primary address, or a portion of a social security number of the customer.

9. The system of claim 7, wherein the offer comprises at least one of an offer threshold or an offer category.

10. The system of claim 7, wherein the machine-readable instructions that cause the computing device to generate the offer further cause the computing device to at least:

store an offer code defining the offer and a source code as offer data; and associate the offer data to the first hash.

11. The system of claim 7, wherein the machine-readable instructions, when executed, further cause the computing device to at least:

transmit the plurality of PII elements of the customer to a credit data system;

receive credit data from the credit data system; and determine a credit authorization state as a function of the credit data.

12. The system of claim 7, wherein the machine-readable instructions, when executed, further cause the computing device to at least:

generate customer interaction data based on the offer, wherein the customer interaction data includes clickstream data of the customer that is acquired during browsing of the offer on the customer device;

associate the first hash to the customer interaction data; and store the customer interaction data as customer data in the database.

13. An article of manufacture including a non-transitory, tangible computer readable storage medium having instructions stored thereon that, in response to execution by a computer based system, cause the computer based system to perform operations comprising:

providing, by the computer based system, a web-based interface to a customer device of a customer;

receiving, by the computer based system from the web-based interface of the customer device, a plurality of personally identifiable information (PII) elements of the customer, wherein the plurality of PII elements of the customer comprise at least first and second PII elements;

receiving, by the computer based system from the customer device of the customer, a first request to generate an offer via a first channel;

initiating, by the computer based system, an offer request process, wherein the first request is passed to an offering engine for the computer based system via an application programming interface;

generating, by a computer data model of the offering engine for the computer based system, the offer in response to receiving the first request to generate the offer via the first channel, wherein the offer is developed using a machine learning process of the offering engine;

generating, by the offering engine for the computer based system, a first hash, via a one way hashing function, that represents the plurality of PII elements of the customer, wherein at least the first and second PII elements of the plurality of PII elements of the customer are applied as inputs to the one way hashing function;

associating, by the offering engine for the computer based system, the first hash with the offer;

storing, by the offering engine for the computer based system, the offer and the first hash within a database without storing of the plurality of PII elements in the database;

transmitting, by the computer based system, the offer to the customer device of the customer;

receiving, by the computer based system from the customer device of the customer or affiliate system, a second request to generate the offer via a second channel, the second request comprising the plurality of PII elements of the customer;

generating, by the offering engine for the computer based system, a second hash, via the one way hashing function, that represents the plurality of PII elements of the customer, wherein at least the first and second PII elements of the plurality of PII elements of the customer are applied as inputs to the one way hashing function without storing of the plurality of PII elements;

determining, by the offering engine for the computer based system, that the first hash matches the second hash;

retrieving, by the offering engine for the computer based system, the offer associated with the first hash from the database; and transmitting, by the computer based system, the offer to the customer device of the customer or affiliate system in response to determining that the first hash matches the second hash.

14. The article of manufacture of claim 13, wherein the operations further comprise:

generating, by the computer based system, customer interaction data based on the offer, wherein the customer interaction data includes clickstream data of the customer that is acquired during browsing of the offer on the customer device;

associating, by the computer based system, the first hash with the customer interaction data; and storing, by the computer based system, the customer interaction data as customer data in the database.

15. The article of manufacture of claim 13, wherein the plurality of PII elements of the customer comprise at least one of a first name, a surname, a middle name, a middle initial, a primary address, or a portion of a social security number of the customer.

16. The article of manufacture of claim 13, wherein the offer comprises at least one of an offer threshold or an offer category.

17. The method of claim 1, wherein the plurality of PII elements of the customer comprise at least a first name, a surname, a primary address, and a portion of a social security number of the customer.

18. The method of claim 17, wherein the primary address comprises a street address, a city, a state, and a zip code.

19. The system of claim 7, wherein the plurality of PII elements of the customer comprise at least a first name, a surname, a primary address, and a portion of a social security number of the customer.

20. The article of manufacture of claim 13, wherein the plurality of PII elements of the customer comprise at least a first name, a surname, a primary address, and a portion of a social security number of the customer.

* * * * *